US006581119B1

United States Patent
Maeda et al.

(10) Patent No.: US 6,581,119 B1
(45) Date of Patent: Jun. 17, 2003

(54) INTERRUPT CONTROLLER AND A MICROCOMPUTER INCORPORATING THIS CONTROLLER

(75) Inventors: Kouichi Maeda, Anjo (JP); Hideaki Ishihara, Okazaki (JP); Sinichi Noda, Okazaki (JP)

(73) Assignee: Denso Corporation, Kariya (JP)

( * ) Notice: Subject to any disclaimer, the term of this patent is extended or adjusted under 35 U.S.C. 154(b) by 428 days.

(21) Appl. No.: 09/598,321

(22) Filed: Jun. 21, 2000

(30) Foreign Application Priority Data

Jun. 23, 1999 (JP) .......................... 11-177064
May 24, 2000 (JP) ........................ 2000-152589

(51) Int. Cl.[7] ...................... G06F 13/24; G06F 13/26; G06F 13/32
(52) U.S. Cl. ................... 710/260; 710/261; 710/262; 710/263; 710/264; 710/265; 710/266; 710/267; 710/268; 710/269
(58) Field of Search ........................... 710/260–269

(56) References Cited

U.S. PATENT DOCUMENTS

| 4,001,783 A | * | 1/1977 | Monahan et al. | ........... 710/264 |
| 4,734,882 A | * | 3/1988 | Romagosa | ................. 710/264 |
| 5,850,558 A |   | 12/1998 | Qureshi et al. | |
| 5,928,348 A | * | 7/1999 | Mukai et al. | ............... 710/263 |
| 5,968,159 A | * | 10/1999 | Mattheis | ..................... 710/264 |

FOREIGN PATENT DOCUMENTS

| EP | 0614148 A1 | 9/1994 |
| EP | 0886217 A2 | 12/1998 |
| GB | 2287806 A | 9/1995 |
| JP | 3-28951 | 2/1991 |
| JP | 5-73472 | 3/1993 |
| JP | 9-330236 | 3/1998 |
| JP | 11-110233 | 4/1999 |

* cited by examiner

*Primary Examiner*—Glenn A. Auve
*Assistant Examiner*—Trisha Vu
(74) *Attorney, Agent, or Firm*—Posz & Bethards, PLC

(57) ABSTRACT

To downsize the circuit scale of a CPU in a microcomputer capable of executing multiple interrupt, an interrupt controller includes an interrupt mask level register. The CPU temporarily transfers or stacks processing data into a RAM. The processing data include a PSR (i.e., system register) value and a PC (i.e., program counter) value of the interrupt processing presently running in CPU. At the same time, the CPU sends a stack signal "STK" to the interrupt controller. In response to the stack signal "STK", the interrupt controller temporarily transfers the interrupt mask level stored in the register into the RAM. When the CPU restarts the suspended interrupt processing, the CPU reads the PSR value and the PC value from the RAM while the CPU produces a return signal "RTN." In response to the return signal "RTN", the interrupt mask level is returned from the RAM to the register.

3 Claims, 2 Drawing Sheets

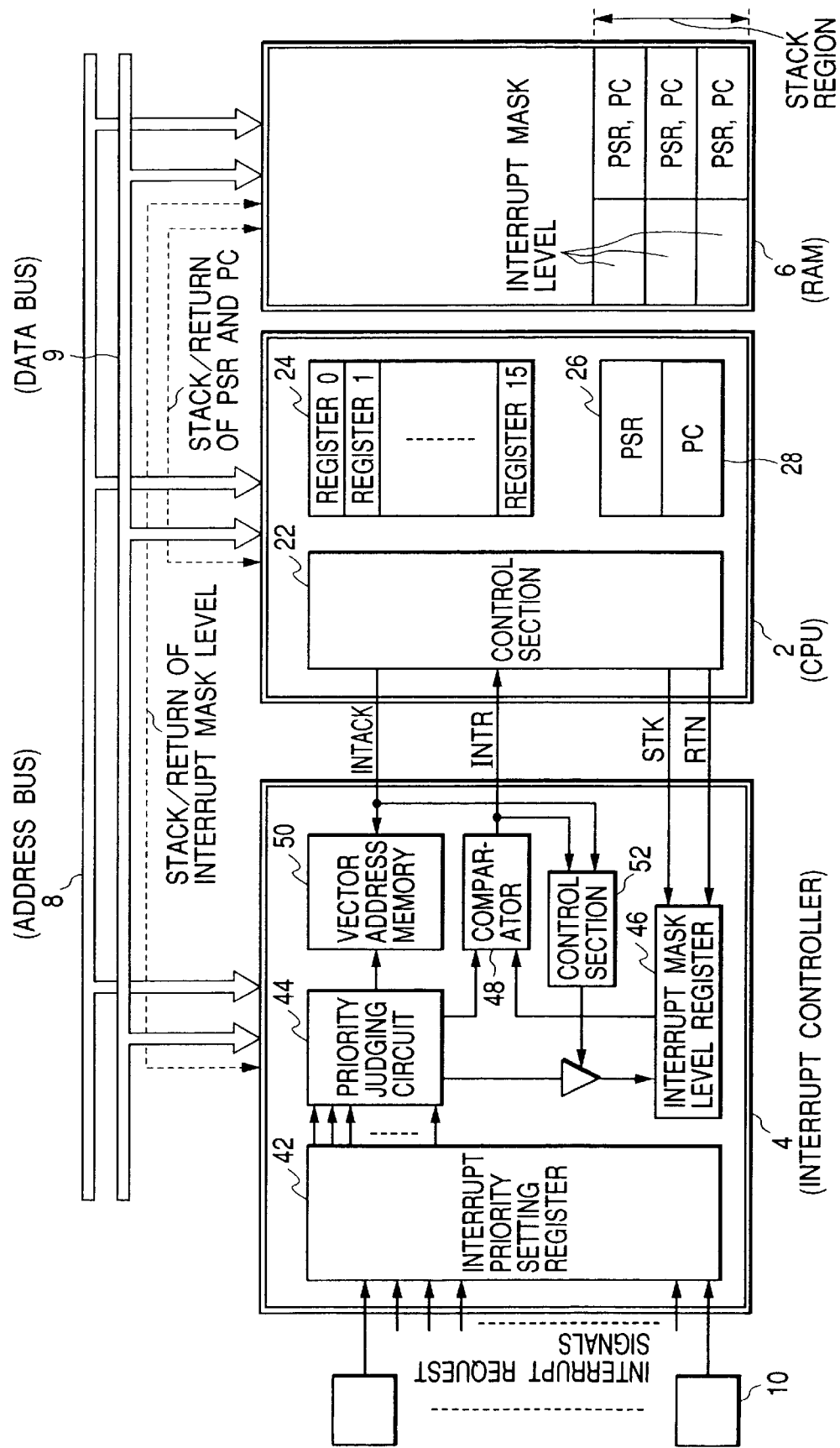

INTERRUPT CONTROLLER AND A MICROCOMPUTER INCORPORATING THIS CONTROLLER

BACKGROUND OF THE INVENTION

The present invention relates to an interrupt controller preferably used to provide a microcomputer capable of implementing multiple interrupt, and also relates to a microcomputer incorporating this interrupt controller.

In addition to a CPU and memories, a general microcomputer is associated with peripheral circuits, such as an A/D converter, a timer, and a PWM (pulse width modulation) waveform generating circuit. In transmitting data from the CPU to these peripheral circuits and in receiving the data from these peripheral circuits to the CPU, interrupt is used as one interfacial means. A high-performance microcomputer is usually associated with a plurality of peripheral circuits each sending an interrupt request to the CPU. In such a case, there is a possibility that the high-performance microcomputer simultaneously receives a plurality of interrupt requests. To manage such overlapping of interrupt requests, the high-performance microcomputer comprises an interrupt controller interposed between the CPU and each of the peripheral circuits.

For example, the interrupt controller operates in synchronism with the CPU under a same or common clock. The interrupt controller collectively administrates all of the interrupt requests. The interrupt controller arranges these multiple interrupt requests into one signal, which is an interrupt request signal sent to the CPU. This interrupt request signal is hereinafter referred to as a CPU interrupt request signal which differs from an interrupt request signal sent from each peripheral circuit to the CPU. The CPU has an interrupt input terminal receiving the CPU interrupt request signal thus outputted from the interrupt controller.

More specifically, when the interrupt controller receives a plurality of interrupt request signals simultaneously from peripheral circuits, the interrupt controller selects an interrupt request having a highest priority. Then, the interrupt controller produces a vector address corresponding to the selected interrupt processing. Meanwhile, the interrupt controller sends the above-described CPU interrupt request signal to the CPU. When the CPU receives the CPU interrupt request signal, the CPU waits for a delay time which is required for the CPU to prepare the interrupt. After the delay time has passed, the CPU sends a response signal to the interrupt controller. The response signal indicates that the preparation for the interrupt has been accomplished. At the same time, the CPU reads the vector address produced from the interrupt controller. Then, the CPU executes the interrupt processing which is stored in an area designated by this vector address.

In this manner, the interrupt controller outputs the CPU interrupt request signal to cause the CPU to implement the interrupt processing requested by the peripheral circuit. When the CPU is presently implementing other interrupt processing, it is necessary to make the CPU suspend the presently running interrupt processing. However, if the CPU automatically suspends every interrupt processing being presently executed in response to each CPU interrupt request signal sent from the interrupt controller, there will be a possibility that the suspended interrupt processing may have a priority higher than that of the interrupt processing designated by the entered CPU interrupt request signal.

Accordingly, in performing the conventional multiple interrupt, the interrupt controller compares the priority of the interrupt processing presently running in the CPU with the priority of the interrupt processing requested by the peripheral circuit. Then, the interrupt controller sends the CPU interrupt request signal to the CPU only when the priority of the interrupt processing requested by the peripheral circuit is higher than the priority of the interrupt processing presently running in the CPU.

However, in comparing the priority of the interrupt processing presently running in the CPU with the priority of the interrupt processing requested by the peripheral circuit, it is definitely necessary for the interrupt controller to recognize the priority of the interrupt processing presently running in the CPU. To this end, the conventional CPU administrates (memorizes) the priority of the interrupt processing presently running in the CPU. When the interrupt controller receives an interrupt request from a peripheral circuit, the interrupt controller receives the priority of the presently running interrupt processing from the CPU and compares it with the priority of the interrupt processing requested by the peripheral circuit.

Meanwhile, when the CPU receives the CPU interrupt request signal from the interrupt controller during execution of the interrupt processing, the CPU suspends the presently running interrupt processing. The CPU temporarily transfers (i.e., stacks) the data necessary in restarting the suspended interrupt processing to an external storage medium, such as RAM. The processing data necessary in restarting the suspended interrupt processing is, for example, a program counter value and a flag processing state or the like. Similarly, the CPU transfers (i.e., stacks) the level information representing the priority of the suspended interrupt processing to the same external storage medium. Thereafter, the CPU executes the newly request interrupt processing in accordance with the vector address read out from the interrupt controller. When the requested interrupt processing is accomplished, the CPU obtains the stacked information from the external storage medium and restarts the suspended interrupt processing based on the obtained information.

As described above, according to the conventional microcomputer executing the multiple interrupt to the CPU, the CPU itself manages (memorizes) the priority of the interrupt processing being presently executed in the CPU. Accordingly, when the CPU suspends the presently running interrupt processing, the CPU temporarily transfers (stacks) the information necessary in restarting the suspended interrupt processing into RAM or a comparable storage medium. In this case, in addition to the information necessary to restart the suspended interrupt processing, the CPU can transfer (stack) the priority of the suspended interrupt processing into the same storage medium. Thus, administrating the priority of the suspended interrupt processing can be easily done by the CPU.

However, to possess such a priority administrating function, the CPU needs to have a component (i.e., register) which stores the priority of the presently running interrupt processing. This significantly enlarges the circuit scale of the CPU.

In some cases, a same spec CPU may be commonly used in constituting a microcomputer requiring no multiple interrupt and in constituting a microcomputer requiring the multiple interrupt. In such cases, if the commonly used CPU has the above-described priority storing register, the circuit scale of the CPU will be too much large for the microcomputer requiring no multiple interrupt. An effective downsizing cannot be realized for this microcomputer. Furthermore, in this case, for the microcomputer requiring no multiple interrupt, its cost unnecessarily increases due to use of the CPU having unnecessary functions.

To enhance the usability of CPU, it is necessary to enlarge the capacity of the register (in other words, the bit number of the register) so that all of the priority data can be stored in the register even if a large number of interrupt requests are generated from peripheral circuits and the data length (i.e., bit number) of the priority being set for each interrupt request becomes large. Accordingly, if required to use a same conventional CPU for various microcomputers whose purposes are different from each other, the circuit scale of this conventional CPU needs to become large. In other words, the microcomputer cannot be downsized.

SUMMARY OF THE INVENTION

The present invention has an object to provide an interrupt controller which makes it possible to use a same or common spec CPU for various microcomputers regardless of implementation of multiple interrupt in these microcomputers, and also has an object to suppress functions of CPU to an allowable minimum level to reduce the circuit scale of CPU. Furthermore, the present invention has an object to provide a microcomputer incorporating this interrupt controller.

In order to accomplish the above and other related objects, the present invention provides a novel interrupt controller. The interrupt controller of the present invention is similar to the above-described conventional interrupt controller in that:

the interrupt controller is responsive to an interrupt request entered from a peripheral circuit;

the interrupt controller compares a priority of the entered interrupt request with a priority of interrupt processing presently running in the CPU;

the interrupt controller outputs an interrupt request signal (i.e., CPU interrupt request signal) to the CPU when the priority of the entered interrupt request is higher than the priority of the interrupt processing presently running in the CPU;

the interrupt controller receives a response signal from the CPU after the interrupt request signal is produced, the response signal representing completion of interrupt preparation in the CPU; and the interrupt controller outputs an interrupt identification data to the CPU directly or indirectly via an external interrupt identification data transmitting means, so as to cause the CPU to execute interrupt processing designated by the interrupt request.

Furthermore, the interrupt controller of the present invention comprises a level information storing/renewing means which is responsive to the interrupt request signal sent to CPU to store level information representing the priority of the interrupt processing presently running in the CPU. When the interrupt processing presently running in the CPU is suspended in response to the interrupt request signal, the level information storing/renewing means temporarily transfers the level information of the suspended interrupt processing to a predetermined area of a storage medium. When the CPU restarts the suspended interrupt processing, the level information storing/renewing means reads the level information of the suspended interrupt processing from the storage medium and renews presently stored level information by the readout level information.

Namely, the interrupt controller of the present invention is characterized in that the level information storing/renewing means is provided for enabling the interrupt controller to administrate the level information (i.e., priority of the interrupt processing presently running in the CPU) which is conventionally administrated (memorized) in the CPU.

Accordingly, using the interrupt controller of the present invention allows the CPU to exclude a storage (i.e., register) for storing the priority of the interrupt processing presently running in the CPU. The circuit scale of the CPU can be reduced. Therefore, when a same spec CPU is commonly used in constituting a small-sized microcomputer requiring no multiple interrupt and a large-sized microcomputer requiring the multiple interrupt, the present invention can attain both downsizing and cost-reduction for the small-sized microcomputer which requires no multiple interrupt.

According to the present invention, it is preferable that the level information storing/renewing means comprises a level information storing section (e.g., register etc.) which stores the level information of the interrupt processing presently running in the CPU. In general, the information amount storable in the level information storing section (in other words, the capacity of the level information storing section) should be sufficient enough to surely store the level information being set in accordance with the type of the interrupt request generated from each peripheral circuit. The information amount may be set to a value sufficiently large compared with the data length of the level information.

However, this will enlarge the size of the interrupt controller. Therefore, a microcomputer employing this interrupt controller cannot be downsized.

Hence, according to a preferred embodiment of the present invention, it is desirable that the information amount storable in the level information storing section (e.g., a register) provided in the level information storing/renewing means is determined in accordance with the data length of the level information being set in accordance with each interrupt request generated from the peripheral circuit. With this arrangement, it becomes possible to minimize the capacity of level information storing section provided in the level information storing/renewing means. Thus, the present invention attains the downsizing of the interrupt controller, and accordingly attains the downsizing of the microcomputer incorporating this interrupt controller.

Namely, the interrupt controller of the present invention can administrate the priority of the interrupt processing by itself, whereas it was conventionally done by the CPU. Thus, the present invention makes it possible to constitute various microcomputers by using a general purpose CPU which possesses no function of administrating the priority of the interrupt processing. Furthermore, the present invention makes it possible to set an adequate capacity for the level information storing section so that a minimum sized microcomputer can execute interrupt processing by using a general purpose CPU.

Meanwhile, the interrupt controller receives the response signal representing completion of interrupt preparation in the CPU. The interrupt controller outputs the interrupt identification data to the CPU directly or indirectly via the external interrupt identification data transmitting means. The interrupt identification data can be any information as long as it can identify the interrupt request sent from each peripheral circuit. For example, the interrupt identification data may be a predetermined signal pattern. According to the preferred embodiment of the present invention, it is desirable that the interrupt identification data is a vector address corresponding to an interrupt processing routine performed in the CPU. This makes it possible for the CPU to execute the interrupt processing by simply storing the vector address into a program counter. Hence, the CPU can promptly start the interrupt processing.

Furthermore, the present invention provides a microcomputer comprising the above-described interrupt controller, the CPU implementing the designated interrupt processing in response to the interrupt request sent from the interrupt controller, and a plurality of peripheral circuits, each sending an interrupt request to the interrupt controller. According to the microcomputer of the present invention, when the peripheral circuit generates an interrupt request, the priority of this interrupt request is compared with the priority of an interrupt processing presently running in the CPU. When the priority of the requested interrupt request is higher than the priority of the presently running interrupt processing, the CPU suspends the presently running interrupt processing and executes the requested interrupt request corresponding to the interrupt request generated by the peripheral circuit. The microcomputer of the present invention can implement the multiple interrupt.

In general, in this kind of the microcomputers capable of implementing the multiple interrupt, the CPU executes a general interrupt exceptional processing (program) in response to an interrupt request signal (i.e., a CPU interrupt request signal) sent from the interrupt computer. By executing this general interrupt exceptional processing, the CPU suspends the interrupt processing presently running therein. The processing data (for example, a program counter value and a flag processing state or the like) required in restarting the suspended processing is temporarily transferred (stacked) into an external storage medium such as RAM. Thereafter, after accomplishing the interrupt processing corresponding to the CPU interrupt request signal, the CPU executes a general interrupt recovery processing (program). Through this general interrupt recovery processing, the CPU reads the stacked processing data from the external storage medium. Then, the CPU restarts the suspended interrupt processing. According to the present invention, the interrupt controller comprises the level information storing/renewing means which performs the transferring (i.e., stacking) operation and the reading operation of the level information in synchronism with the above-described operation of the CPU.

Accordingly, in the microcomputer of the present invention, the interrupt controller implements the multiple interrupt to the CPU. Like the conventional microcomputer, after accomplishing new interrupt processing, the microcomputer of the present invention can restart the suspended interrupt processing. The timings for transferring (stacking) and reading the processing data in the CPU may be set to be different from the timings for transferring (stacking) and reading the level information in the interrupt controller. This elongates the time required for starting the new interrupt processing or restarting the suspended interrupt processing.

Accordingly, to eliminate the above-described problem, the preferred embodiment of the present invention proposes a preferable arrangement for the CPU and the level information storing/renewing means in the interrupt controller.

Namely, according to the microcomputer disclosed in the preferred embodiment of the present invention, the CPU implements interrupt exceptional processing. In this interrupt exceptional processing, the CPU suspends the interrupt processing presently running therein when the CPU receives an interrupt request signal from the interrupt controller, the CPU sends a stack instruction to the interrupt controller while transferring processing data to an external storage medium, the processing data being necessary in restarting the suspended interrupt processing, and the interrupt controller transfers the level information stored in the level information storing/renewing means to the external storage medium, thereby simultaneously stacking the processing data and the level information in the same storage medium.

Furthermore, in the microcomputer disclosed in the preferred embodiment of the present invention, the CPU implements the interrupt recovery processing in which the CPU restarts the suspended interrupt processing upon accomplishing the designated interrupt processing, wherein the CPU reads the processing data from the external storage medium while generating a return instruction to the interrupt controller, thereby causing the level information storing/renewing means to read the level information from the external storage medium in synchronism with the reading of the processing data by the CPU.

Meanwhile, in the interrupt controller, the level information storing/renewing means performs the transferring and reading of the level information to and from the external storage medium when the level information storing/renewing means receives the stack instruction and the return instruction from the CPU.

Therefore, according to the microcomputer disclosed in the preferred embodiment of the present invention, the timings for transferring (stacking) and reading the level information in the interrupt controller can be equalized with the timings for transferring and reading the processing data in the CPU. Thus, these data can be simultaneously transferred (stacked) into a same storage medium such as RAM, and simultaneously read out from this storage medium. Hence, it becomes possible for the CPU to shorten the time required for starting the new interrupt processing corresponding to the multiple interrupt or restarting the suspended interrupt processing.

BRIEF DESCRIPTION OF THE DRAWINGS

The above and other objects, features and advantages of the present invention will become more apparent from the following detailed description which is to be read in conjunction with the accompanying drawings, in which:

FIG. 1 is a block diagram showing an essential arrangement of a microcomputer in accordance with a preferred embodiment of the present invention;

DESCRIPTION OF A PREFERRED EMBODIMENT

Figure 2A:
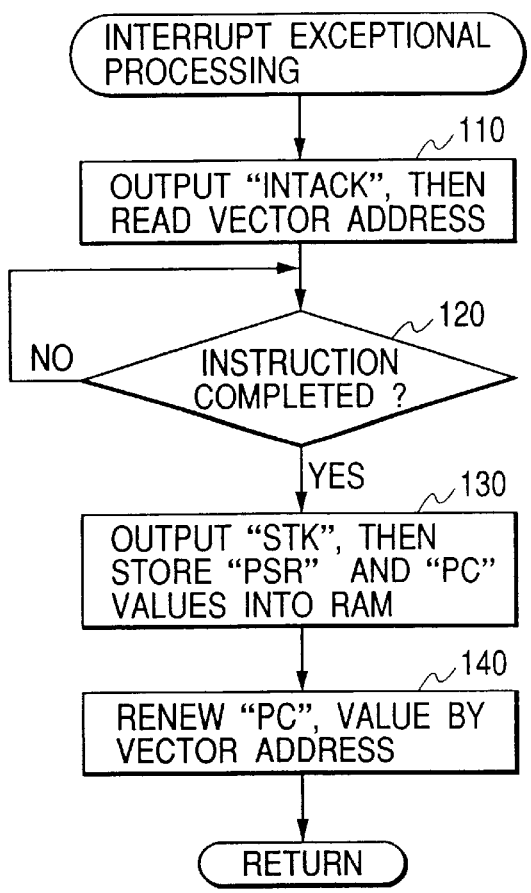
FIG. 2A is a flowchart showing interrupt exceptional processing executed in a CPU of the microcomputer in accordance with the preferred embodiment of the present invention.

A preferred embodiment of the present invention will be explained hereinafter with reference to attached drawings.

FIG. 1 is a block diagram showing an essential arrangement of a microcomputer in accordance with a preferable embodiment of the present invention.

As shown in FIG. 1, the microcomputer of the present invention comprises a CPU 2, an interrupt controller 4, a RAM 6, as well as a ROM (not shown) and various peripheral circuits 10 (e.g., an A/D converter, a timer, a PWM (pulse width modulation) waveform generating circuit). These sections are connected to each other via an address bus 8, a data bus 9, and a control bus (not shown). CPU 2 and the interrupt controller 4 operate in synchronism with a same two-phase clock signal.

The peripheral circuits 10, such as an A/D converter, a timer, a PWM waveform generating circuit, when any event occurs, respectively generate an interrupt request signal which is sent to the interrupt controller 4. The event may be a completion of an A/D conversion in the A/D converter, or an overflow of a timer count in the timer. In response to the occurrence of an event, each peripheral circuit 10 changes the interrupt request signal from a Low level, i.e., an invalid level, to a High level, i.e., a valid level. Then, each peripheral circuit 10 holds the interrupt request signal in a same High level state until CPU 2 implements an interrupt clear instruction for a designated peripheral circuit 10 corresponding to this interrupt request signal.

Meanwhile, CPU 2 has a pipeline architecture, for example, consisting of a plurality of stages. CPU 2 is arranged to perform the parallel processing preferably applied to the fetch of instructions stored in the program storing ROM, read/write of data from/to the peripheral circuits 10 or RAM 6, and implementation of instructions. To this end, CPU 2 comprises a control section 22 executing the above processing, in addition to a general purpose register section 24, a system register (PSR) 26, and a program counter (PC) 28. The general purpose register section 24 consists of a total of 16 registers (i.e., register 0 to register 15), each temporarily storing data used in various processing executed in the control section 22. The system register (PSR) 26 stores information, such as a carry flag value, representing the condition of the processing presently executed in the control section 22. The program counter (PC) 28 stores the location of the processing presently executed in the control section 22.

CPU 2 realizes the multiple interrupt which is an essential function required in this invention. When CPU 2 receives a CPU interrupt request signal "INTR" from the interrupt controller 4, CPU 2 implements interrupt exceptional processing (or interrupt exceptional treatment) which is later-described with reference to the flowchart of FIG. 2A. In this case, to give a priority to the received interrupt request, CPU 2 suspends the presently running processing and starts implementation of the requested interrupt processing corresponding to the CPU interrupt request signal "INTR." When the requested interrupt processing is completed, CPU 2 executes interrupt recovery processing which is later-described with reference to the flowchart of FIG. 2B, thereby resuming the suspended processing.

On the other hand, the interrupt controller 4 comprises an interrupt priority setting register 42, a priority judging circuit 44, an interrupt mask level register 46, and a comparator 48. The interrupt priority setting register 42 sets beforehand the priority to the interrupt processing corresponding to each interrupt request signal entered from the above-described peripheral circuits 10. The priority judging circuit 44 receives a plurality of priority values produced from the interrupt priority setting register 42 which correspond to a plurality of interrupt request signals simultaneously entered to the interrupt priority setting register 42. Then, the priority judging circuit 44 selects an interrupt request signal having a highest priority with reference to the received priority values. The interrupt mask level register 46 stores an interrupt mask level which represents the priority of the interrupt processing presently running in CPU 2. The comparator 48 compares the priority of the selected interrupt request signal, which is recognized by the priority judging circuit 44 as having the highest priority, with the interrupt mask level stored in the interrupt mask level register 46. When the priority of the interrupt request signal newly selected by the priority judging circuit 44 is higher than the priority of the interrupt processing presently running in CPU 2, the comparator 48 sends a CPU interrupt request signal "INTR" to CPU 2.

The interrupt mask level register 46, serving as a level information storing section of the present invention, is arranged to store the priority of each interrupt processing corresponding to an interrupt request signal entered from each peripheral circuit 10. The priority of each interrupt processing is stored as an interrupt mask level of 3 bits in accordance with the type of the interrupt processing. The priority, being set for each interrupt request signal entered from each peripheral circuit 10, is for example expressed by a binary data of 3 bits ranging from 0 to 7.

The interrupt controller 4 further comprises a vector address memory section 50 which stores predetermined vector addresses (corresponding to interrupt identification data). The vector addresses are necessary when CPU 2 executes the interrupt processing corresponding to each interrupt request signal entered from each peripheral circuit 10. The vector address memory section 50, after the comparator 48 sends the CPU interrupt request signal "INTR" to CPU 2, receives a response signal "INTACK" generated from CPU 2 through the later-described interrupt exceptional processing. Then, the vector address memory section 50 outputs a vector address corresponding to the CPU interrupt request signal "INTR" through the data bus 9. As a result, CPU 2 reads the vector address via the data bus 9 and CPU 2 can implement the interrupt processing corresponding to the CPU interrupt request signal "INTR."

The interrupt controller 4 further comprises a control section 52 which monitors the CPU interrupt request signal "INTR" sent from the comparator 48 to CPU 2 and the response signal "INTACK" generated from CPU 2. The control section 52 renews the content of the interrupt mask level register 46. In this case, the content of the interrupt mask level register 46 is the priority of the interrupt processing executed in CPU 2. Namely, the comparator 48 outputs the CPU interrupt request signal "INTR." CPU 2 implements the interrupt processing corresponding to this request signal. Meanwhile, by the operation of the control section 52, the content of the interrupt mask level register 46 is renewed by a data corresponding to the interrupt processing actually executed in CPU 2.

However, when CPU 2 receives the CPU interrupt request signal "INTR", CPU 2 suspends the interrupt processing being presently executed therein. CPU 2 executes the requested interrupt processing corresponding to the received CPU interrupt request signal "INTR." Then, upon completing the requested interrupt processing, CPU 2 restarts the suspended interrupt processing. Accordingly, relying on only the renewal operation of the interrupt mask level register 46 performed by the control section 52 is inadequate to correctly set the content of the interrupt mask level register 46 to an interrupt mask level representing the priority of the interrupt processing being actually executed in CPU 2.

In view of the foregoing, when CPU 2 suspends the presently running interrupt processing in response to the CPU interrupt request signal "INTR", CPU 2 implements the later-described interrupt exceptional processing to produce an interrupt mask level stack signal "STK." The interrupt mask level stack signal "STK" is sent to the interrupt controller 4 as a stack instruction of the interrupt mask level. When CPU 2 restarts the suspended interrupt processing at a later timing, CPU 2 implements the later-described interrupt recovery processing to produce an interrupt mask level return signal "RTN." The interrupt mask level return signal "RTN" is sent to the interrupt controller 4 as a return instruction of the interrupt mask level.

When the interrupt controller 4 receives the interrupt mask level stack signal "STK" from CPU 2, the interrupt mask level register 46 outputs internal interrupt mask level on the signal lines constituting the data bus 9. The number of the signal lines corresponds to the bit number (3 bits in this embodiment) of the interrupt mask level. The interrupt mask level thus outputted on the data bus 9, i.e., the priority of the interrupt processing suspended by CPU 2, is stored in a predetermined stack area in RAM 6. When the interrupt controller 4 receives the interrupt mask level return signal "RTN" from CPU 2, the interrupt mask level register 46 inputs the interrupt mask level from the stack of RAM 6 via the same signal lines used in outputting this interrupt mask level.

In other words, by doing so, the content of the interrupt mask level register 46 (i.e., the interrupt mask level) always agrees with the priority of the interrupt processing presently running in CPU 2. In this embodiment, the interrupt mask level register 46 and the control section 52 cooperatively act as a level information storing/renewing means of the present invention.

Next, the interrupt exceptional processing and the interrupt recovery processing executed by CPU 2 will be explained in more detail.

FIG. 2A is a flowchart showing the details of the interrupt exceptional processing which is implemented in response to the CPU interrupt request signal "INTR" entered from the interrupt controller 4 under a condition where the preparation for the interrupt is accomplished.

When the interrupt exceptional processing begins, CPU 2 generates the response signal "INTACK" representing the completion of the preparation for the interrupt in step 110. The response signal "INTACK" is sent to the interrupt controller 4. Then, CPU 2 reads a vector address from the interrupt controller 4. The readout vector address is for implementing the processing corresponding to the CPU interrupt request signal "INTR." Next, in step 120, CPU 2 waits until the present instruction is accomplished. In this case, the present instruction is an instruction having been executed at the moment CPU 2 has received the CPU interrupt request signal "INTR" from the interrupt controller 4. When the present instruction is accomplished (YES in step 120), the control flow proceeds to the next step 130.

Then, in step 130, CPU 2 designates a predetermined stack area in RAM 6 via the address bus 8 and sends the interrupt mask level stack signal "STK" to the interrupt controller 4. Furthermore, CPU 2 causes the system register (PSR) 26 and the program counter (PC) 28 to output their internal data via predetermined signal lines of the data bus 9. Thus, when the interrupt processing is suspended in response to the CPU interrupt request signal "INTR", a PSR value, a PC value and an interrupt mask level of the suspended interrupt processing are transferred to and temporarily stored in the predetermined stack area in RAM 6.

The processing of step 130 is performed for simultaneously transferring the above data into the predetermined stack area in RAM 6, namely, for the simultaneously stacking of the PSR value and the PC value of the interrupt processing suspended in response to the CPU interrupt request signal "INTR" as well as the interrupt mask level of this suspended interrupt processing. To this end, the data (i.e., PSR value and PC value) in the system register (PSR) 26 and the program counter (PC) 28 is sent via predetermined signal lines of the data bus 9 which are different from the signal lines for the interrupt mask level register 46. More specifically, among a plurality of signal lines corresponding to all bits (32 bits in this embodiment), three signal lines corresponding to the upper 3 bits are used for outputting the interrupt mask level. On the other hand, the signal lines used for outputting the PSR value and the PC value are different from the above three signal lines dedicated to the interrupt mask level.

Figure 3:
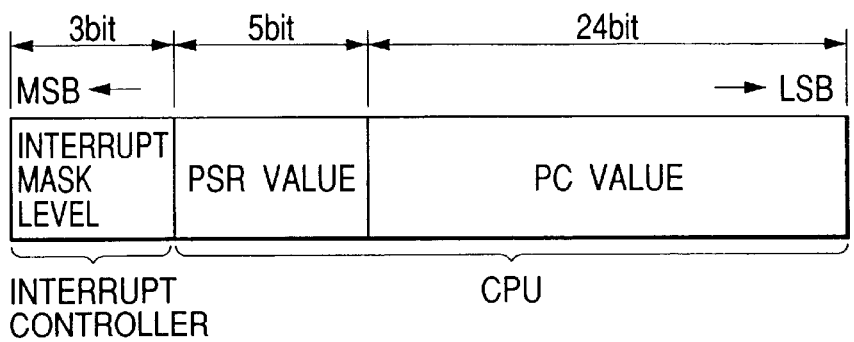
FIG. 3 is a view showing an allocation of interrupt processing data transmitted via a data bus during the interrupt exceptional processing and the interrupt recovery processing in accordance with the preferred embodiment of the present invention.

FIG. 3 shows a detailed allocation of the signal lines in the data bus 9. The signal lines for the upper 3 bits are used to transmit the interrupt mask level from the interrupt mask level register 46 to RAM 6. The signal lines for the lower 24 bits are used to transmit the data (i.e., PC value of 24 bits) of the program counter (PC) 28 to RAM 6. The signal lines for the remaining 5 bits are used to transmit the data (i.e., PSR value of 5 bits) of the system register (PSR) 26 to RAM 6.

After the stacking of the data into RAM 6 is accomplished for the interrupt processing suspended by CPU 2, the control flow proceeds to step 140. In step 140, CPU 2 sets the vector address read out in step S110 into the program counter (PC) 28, thereby starting new interrupt processing which is designated by the CPU interrupt request signal "INTR" entered from the interrupt controller 4.

Figure 2B:
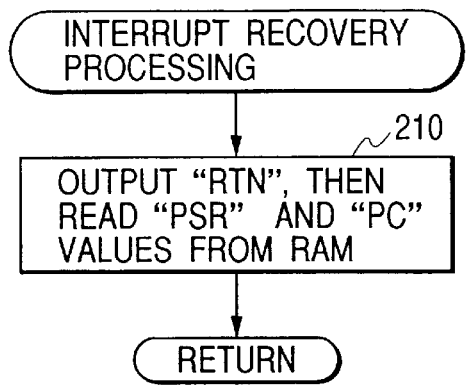
FIG. 2B is a flowchart showing interrupt recovery processing executed in the CPU of the microcomputer in accordance with the preferred embodiment of the present invention.

FIG. 2B is a flowchart showing the details of the interrupt recovery processing executed in response to the return instruction. The return instruction is produced after completing the interrupt processing started in the above interrupt exceptional processing. The interrupt recovery processing is implemented in the following manner. In step 210, CPU 2 designates the predetermined stack area of RAM 6 via the address bus 8. In response to this designation, RAM 6 outputs the latest stack data; namely, the above-described interrupt mask level, the PSR value, and the PC value of the suspended interrupt processing. Meanwhile, CPU 2 sends an interrupt mask level return signal "RTN" to the interrupt controller 4. The interrupt mask level is input to the interrupt controller 4 via the same signal lines which are used in outputting the interrupt mask level to RAM 6. The PSR value and the PC value are input to CPU 2 via the remaining signal lines (corresponding to 29 bits in this embodiment) of the data bus 9. The PSR value and the PC value, thus returned to CPU 2, are written into the system register (PSR) 26 and the program counter (PC) 28, respectively.

As a result, CPU 2 restarts the interrupt processing currently suspended in response to the CPU interrupt request signal "INTR" of the interrupt controller 4. In the interrupt controller 4, the interrupt master level register 46 stores the interrupt mask level representing the priority of the restarted interrupt processing.

As explained above, according to the preferred embodiment of the present invention, the microcomputer includes the interrupt controller 4 equipped with the interrupt mask level register 46. According to this arrangement, the interrupt controller 4 can administrate the priority of the interrupt processing presently running in CPU 2. This is different from a conventional microcomputer performing the multiple interrupt processing in which the interrupt mask level register is provided in the CPU.

Accordingly, using the interrupt controller 4 of the above-described embodiment makes it possible to downsize the circuit scale of CPU 2 because CPU 2 needs not include an interrupt mask level register in realizing the microcomputer capable of executing multiple interrupt. In other words, CPU 2 is commonly usable for a small-sized microcomputer which needs not execute multiple interrupt and therefore does not include the interrupt controller 4 and for a large-sized microcomputer which requires the multiple interrupt. Thus, it becomes possible to downsize the scale of the small-sized microcomputer which does not require the multiple interrupt. Furthermore, the cost of the small-sized microcomputer can be reduced.

Furthermore, according to the above-described embodiment, CPU 2 suspends the presently running interrupt processing when CPU 2 receives the CPU interrupt request signal "INTR" from the interrupt controller 4. When CPU 2 starts new interrupt processing while suspending the presently running interrupt processing, CPU 2 temporarily transfers the processing data (i.e., PSR value, PC value) of the suspended interrupt processing into the stack area of RAM 6. The processing data thus temporarily transferred into RAM 6 are required in restarting the suspended interrupt processing. At the same time, the interrupt mask level stored in the interrupt mask level register 46 is temporarily transferred into the predetermined stack area of RAM 6. When CPU 2 restarts the suspended interrupt processing, CPU 2 reads out the processing data (i.e., PSR value and PC value) from RAM 6. The readout processing data (i.e., PSR value and PC value) are written into the system register (PSR) 26 and the program counter (PC) 28, respectively. At the same time, the interrupt mask level register 46 reads out the interrupt mask level from RAM 6 and renews an interrupt mask level presently stored therein by the readout interrupt mask level.

According to the microcomputer of the above-described embodiment, the interrupt controller 4 implements the multiple interrupt to CPU 2. After accomplishing the requested interrupt processing, it is possible to restart the suspended interrupt processing. The time required for suspending the presently running interrupt processing and starting the new interrupt processing, as well as the time required for accomplishing the new interrupt processing and restarting the suspended interrupt processing, are not longer than the conventionally required times. Thus, each interrupt processing starts and/or restarts quickly.

The present invention is not limited to the above-described embodiment, and therefore can be modified in various ways.

For example, in the above-described embodiment, the data bus 9 is 32 bits. When CPU 2 suspends/restarts the interrupt processing, the signal lines constituting the data bus 9 can be separated into three groups. A first group is for transmitting the interrupt mask level. A second group is for transmitting the PSR value. And, a third group is for transmitting the PC value. In other words, the above three data can be simultaneously transmitted by using the data bus 9 of 32 bits. However, the data bus 9 may be 16 bits whereas the total bit number of the required data is same (i.e., 32 bits). In such a case, it is preferable that the data transmission is divided into two stages. Namely, in temporarily storing the interrupt processing data into the stack area of RAM 6 or in reading these data from the stack area of RAM 6, transmission of the required data is accomplished by performing the transmitting operation two times repetitively.

Furthermore, in the above-described embodiment, the interrupt mask level is 3 bits. However, the kinds of interrupt request signals entered from the peripheral circuits 10 may be few. The priority of each interrupt request signal may be expressed by a binary data of 2 bits. In such a case, the interrupt mask level register 46 can be arranged to store a binary data of 2 bits. And, the interrupt mask level of two bits is transmitted from the interrupt controller 4 to RAM 6. On the other hand, the kinds of interrupt request signals entered from the peripheral circuits 10 may be many. The priority of each interrupt request signal may not be expressed by a binary data of 3 bits. In this case, the bit number of the interrupt mask level register 46 should be set to an appropriate value agreeable to the bit number (e.g., 5 bits) of the binary data representing the priority. Furthermore, it is preferable to divide the transmission of the interrupt mask level (5 bits) into two stages; a first stage is a transmission for the upper 3 bits and a second stage is a transmission for the lower 2 bits.

Furthermore, in the above-described embodiment, CPU 2 sends the response signal "INTACK" to the interrupt controller 4. In response to this response signal "INTACK", the interrupt controller 4 returns the interrupt identification data to CPU 2. A vector address is used for the interrupt identification data. However, the interrupt identification data is not limited to the vector address. Any other information, which is capable of identifying the interrupt processing to be executed in CPU 2, can be used as the interrupt identification data. For example, the interrupt identification data may be a predetermined signal pattern. Furthermore, instead of using the data bus 9, parallel or serial signal lines can be used to transmit the interrupt identification data from the interrupt controller 4 to CPU 2.

Furthermore, in the above-described embodiment, the interrupt controller 4 includes the built-in vector address memory section 50 serving as an interrupt discrimination data transmitting means. However, the built-in vector address memory section 50 can be replaced by an external device when this external device has the same functional circuit as the vector address memory section 50. The interrupt controller 4 can cause this external device to output the vector address (i.e., interrupt identification data).

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An interrupt controller provided between a CPU and at least one peripheral circuit, wherein said interrupt controller is responsive to an interrupt request entered from said peripheral circuit, said interrupt controller compares a priority of said interrupt request with a priority of interrupt processing presently running in said CPU, said interrupt controller outputs an interrupt request signal to said CPU when the priority of said interrupt request is higher than the priority of said interrupt processing presently running in said CPU, said interrupt controller receives a response signal from said CPU after said interrupt request signal is produced, said response signal representing completion of interrupt preparation in said CPU, said interrupt controller outputs interrupt identification data to said CPU so as to cause said CPU to execute interrupt processing designated by said interrupt request, said interrupt controller comprises a level information storing/renewing means which is responsive to said interrupt request signal to store level information representing the priority of said interrupt processing presently running in said CPU, said level information storing/renewing means temporarily transfers the level information of said suspended interrupt processing to a predetermined area of a storage medium when said interrupt processing presently running in said CPU is suspended in response to said interrupt request signal, said level information storing/renewing means reads said level information of said suspended interrupt processing from said storage medium and renews presently stored level information by the readout level information when said CPU restarts said suspended interrupt processing, said level information storing/renewing means comprises a level information storing section which stores the level information of said interrupt processing presently running in said CPU, and an information amount storable in said level information storing section is determined in accordance with a data length of the level information being set in accordance with each interrupt request generated from said peripheral circuit.

2. The interrupt controller in accordance with claim 1, wherein said interrupt identification data is a vector address corresponding to an interrupt processing routine of said CPU.

3. A microcomputer comprising:

an interrupt controller, a CPU implementing designated interrupt processing in response to an interrupt request signal sent from said interrupt controller, and a plurality of peripheral circuits, each sending an interrupt request to said interrupt controller, wherein said interrupt controller is responsive to the interrupt request entered from said peripheral circuit, said interrupt controller compares a priority of said interrupt request with a priority of interrupt processing presently running in said CPU, said interrupt controller outputs the interrupt request signal to said CPU when the priority of said interrupt request is higher than the priority of said interrupt processing presently running in said CPU, said interrupt controller receives a response signal from said CPU after said interrupt request signal is produced, said response signal representing completion of interrupt preparation in said CPU, said interrupt controller outputs interrupt identification data to said CPU so as to cause said CPU to execute interrupt processing designated by said interrupt request, said interrupt controller comprises a level information storing/renewing means which is responsive to said interrupt request signal to store level information representing the priority of said interrupt processing presently running in said CPU, said level information storing/renewing means temporarily transfers the level information of said suspended interrupt processing to a predetermined area of a storage medium when said interrupt processing presently running in said CPU is suspended in response to said interrupt request signal, said level information storing/renewing means reads said level information of said suspended interrupt processing from said storage medium and renews presently stored level information by the readout level information when said CPU restarts said suspended interrupt processing, said CPU implements interrupt exceptional processing in which said CPU suspends the interrupt processing presently running therein when said CPU receives the interrupt request signal from said interrupt controller, said CPU sends a stack instruction to said interrupt controller while transferring processing data to an external storage medium, said processing data being necessary in restarting said suspended interrupt processing, and said interrupt controller transfers the level information stored in said level information storing/renewing means to said external storage medium, thereby simultaneously stacking said processing data and said level information in the same storage medium, and said CPU implements interrupt recovery processing, in which said CPU restarts said suspended interrupt processing upon accomplishing said designated interrupt processing, wherein said CPU reads said processing data from said external storage medium while generating a return instruction to said interrupt controller, thereby causing said level information storing/renewing means to read said level information from said external storage medium in synchronism with the reading of said processing data by said CPU, and said level information storing/renewing means in said interrupt controller performs the transferring and reading of said level information to and from said external storage medium when said level information storing/renewing means receives said stack instruction and said return instruction from said CPU.

* * * * *